US012495473B2

(12) United States Patent
Matsumoto et al.

(10) Patent No.: US 12,495,473 B2
(45) Date of Patent: Dec. 9, 2025

(54) LIGHT SOURCE DEVICE, OBSERVATION SYSTEM, AND COLOR-BALANCE CORRECTION METHOD

(71) Applicant: OLYMPUS MEDICAL SYSTEMS CORP., Tokyo (JP)

(72) Inventors: Koji Matsumoto, Tokyo (JP); Masahiro Nishio, Tokyo (JP); Kazuto Fujiwara, Saitama (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 72 days.

(21) Appl. No.: 18/678,809

(22) Filed: May 30, 2024

(65) Prior Publication Data

US 2024/0314901 A1    Sep. 19, 2024

Related U.S. Application Data

(63) Continuation of application No. PCT/JP2022/009422, filed on Mar. 4, 2022.

(51) Int. Cl.
*H05B 45/18*    (2020.01)
*A61B 1/06*    (2006.01)
(Continued)

(52) U.S. Cl.
CPC .......... *H05B 45/18* (2020.01); *A61B 1/0646* (2013.01); *A61B 1/0661* (2013.01);
(Continued)

(58) Field of Classification Search
CPC .......... H05B 45/18; H05B 45/28; F21V 9/45; F21V 9/08; F21V 9/40; G01J 3/0286;
(Continued)

(56) References Cited

U.S. PATENT DOCUMENTS 8,699,138 B2 *   4/2014  Cogger ............... A61B 1/0669
                                          359/290
2002/0097000 A1  7/2002  Muthu et al.
(Continued)

FOREIGN PATENT DOCUMENTS

EP    3318917 A1    5/2018
JP    H11260568 A   9/1999
(Continued)

OTHER PUBLICATIONS

International Search Report dated Apr. 5, 2022 received in PCT/JP2022/009422.
(Continued)

*Primary Examiner* — Daniel D Chang
(74) *Attorney, Agent, or Firm* — Scully, Scott, Murphy & Presser, P.C.

(57) ABSTRACT

A light source device includes light sources, a light output unit, optical filters, temperature sensors detecting current temperatures of the sources, light quantity sensors detecting current light quantities of light beams before traveling through the filters, a storage, and a processor. The storage stores first correlation information between the temperatures of the sources and spectral information and second correlation information between the spectral information and light quantity of light at the unit. The processor is configured to calculate a variation in the spectral information based on each current temperature and the first information, calculate a variation in the light quantity of the light at the unit caused by a change in the spectral information based on the variation in the spectral information and the second information, and calculate a light-quantity correction amount for each of the sources based on the variation in the light quantity and the current light quantity.

11 Claims, 14 Drawing Sheets

(51) Int. Cl.
*F21V 9/08* (2018.01)
*F21V 9/40* (2018.01)
*F21V 9/45* (2018.01)
*G01J 3/02* (2006.01)
*G01J 3/30* (2006.01)
*G01J 3/51* (2006.01)
*H05B 45/28* (2020.01)
*F21Y 113/17* (2016.01)
*F21Y 115/10* (2016.01)

(52) U.S. Cl.
CPC .............. *A61B 1/0684* (2013.01); *F21V 9/08* (2013.01); *F21V 9/40* (2018.02); *F21V 9/45* (2018.02); *G01J 3/0286* (2013.01); *G01J 3/30* (2013.01); *G01J 3/51* (2013.01); *H05B 45/28* (2020.01); *F21Y 2113/17* (2016.08); *F21Y 2115/10* (2016.08)

(58) Field of Classification Search
CPC . G01J 3/30; G01J 3/51; F21Y 2113/17; F21Y 2115/10; A61B 1/0646; A61B 1/0661; A61B 1/0684
See application file for complete search history.

(56) References Cited

U.S. PATENT DOCUMENTS

| | | | | |
|---|---|---|---|---|
| 2013/0188383 | A1* | 7/2013 | Jaffe | F21V 9/30 362/553 |
| 2015/0109759 | A1* | 4/2015 | Sugano | A61B 1/128 362/84 |
| 2018/0131911 | A1 | 5/2018 | Mizuno | |
| 2019/0379178 | A1 | 12/2019 | Muramatsu et al. | |
| 2020/0069164 | A1 | 3/2020 | Oki et al. | |
| 2021/0120646 | A1 | 4/2021 | Oki et al. | |

FOREIGN PATENT DOCUMENTS

| | | | |
|---|---|---|---|
| JP | 2007250986 | A | 9/2007 |
| JP | 4116435 | B2 | 7/2008 |
| JP | 4286801 | B2 | 7/2009 |
| JP | 4645295 | B2 | 3/2011 |
| JP | 5311639 | B2 | 10/2013 |
| JP | 2015165641 | A | 9/2015 |
| JP | 6028440 | B2 | 11/2016 |
| JP | 2018072758 | A | 5/2018 |
| WO | 2002047438 | A2 | 6/2002 |
| WO | 2007049180 | A1 | 5/2007 |
| WO | 2018131256 | A1 | 7/2018 |
| WO | 2018207456 | A1 | 11/2018 |
| WO | 2019017051 | A1 | 1/2019 |

OTHER PUBLICATIONS

"Story of Light and Color Part 2", CCS Inc., Kyoto, Japan Retrieved from the Internet in Nov. 2021, URL: https://www.ccs-inc.co.jp/guide/column/light_color_part2/vol09.html.

Luminus Devices, Inc., "CBT-90 Product Datasheet, PDS-001230 Rev 16", CA, USA Retrieved from the Internet in Mar. 2021, URL:https://download.luminus.com/datasheets/Luminus_CBT-90-W_Datasheet.pdf.

* cited by examiner

FIG. 13

| | LIGHT QUANTITY OF LED | AMBIENT TEMPERATURE | TEMPERATURE OF LED | CENTER WAVELENGTH | WAVELENGTH WIDTH | LIGHT QUANTITY AFTER FILTER |
|---|---|---|---|---|---|---|
| STATE 1 | Q1 | t1 | T1 | $\lambda 1$ | W1 | Q1' |
| STATE 2 | Q2 | t2 | T2 | $\lambda 2$ | W2 | Q2' |
| STATE 3 | Q3 | t3 | T3 | $\lambda 3$ | W3 | Q3' |
| STATE 4 | Q4 | t4 | T4 | $\lambda 4$ | W4 | Q4' |
| ... | ... | ... | ... | ... | ... | ... | ature of the light source and the spectral information about the light beam output from the light source; calculating a variation in a light quantity of the light beam, caused by a change in the spectral information, after traveling through the at least one optical filter based on the variation in the spectral information and second correlation information indicating a relationship between the spectral information about the light beam and the light quantity of the light beam

LIGHT SOURCE DEVICE, OBSERVATION SYSTEM, AND COLOR-BALANCE CORRECTION METHOD

CROSS-REFERENCE TO RELATED APPLICATIONS

This is a continuation of International Application PCT/JP2022/009422 which is hereby incorporated by reference herein in its entirety.

TECHNICAL FIELD

The present invention relates to light source devices, observation systems, and color-balance correction methods.

BACKGROUND ART

A known light source device in the related art generates illumination light of a desired color by mixing LED light beams of a plurality of colors emitted from a plurality of LEDs (e.g., see Patent Literature 1). However, the wavelength of light emitted from an LED changes due to a temperature change in the LED. Therefore, in order to make the color of the illumination light constant, the output of each LED is controlled based on the temperature. In Patent Literature 1, the electric power supplied to the LED of each color is controlled based on emission-peak-wavelength variation data with respect to the temperature of the LED and the temperature of an LED unit equipped with the plurality of LEDs, thereby keeping the color of the illumination light constant.

CITATION LIST

Patent Literature (PTL 1)
The Publication of Japanese Patent No. 4645295

SUMMARY OF INVENTION

An aspect of the present invention provides a light source device including: a plurality of light sources that respectively output a plurality of light beams having different spectra from each other; a light output unit that includes a hole and that externally outputs illumination light generated from the plurality of light beams; at least one optical filter that has specific spectral transmission properties and through which at least one of the light beams output from at least one light source of the plurality of light sources travels; at least one temperature sensor that detects a current temperature of the at least one light source; at least one light quantity sensor that detects a current light quantity of the at least one light beam before traveling through the optical filter; a storage; and a processor. The storage stores first correlation information and second correlation information about the at least one light source. The first correlation information indicates a relationship between the temperature of the light source and spectral information about the light beam output from the light source. The second correlation information indicates a relationship between the spectral information and a light quantity of the light beam at the light output unit. The processor is configured to: calculate a variation in the spectral information about the at least one light beam based on the current temperature and the first correlation information; calculate a variation in the light quantity of the at least one light beam at the light output unit, caused by a change in the spectral information, based on the variation in the spectral information and the second correlation information; and calculate a light-quantity correction amount for the at least one light source based on the variation in the light quantity and the current light quantity.

Another aspect of the present invention provides an observation system including: a light source device; an imager that captures an image of a subject illuminated with illumination light output from the light source device and generates an image signal; an image processor configured to process the image signal; a storage; and a processor. The light source device includes: a plurality of light sources that respectively output a plurality of light beams having different spectra from each other; a light output unit that includes a hole and that externally outputs the illumination light generated from the plurality of light beams; at least one optical filter that has specific spectral transmission properties and through which at least one of the light beams output from at least one light source of the plurality of light sources travels; at least one temperature sensor that detects a current temperature of the at least one light source; and at least one light quantity sensor that detects a current light quantity of the at least one light beam before traveling through the optical filter. The storage stores first correlation information and second correlation information about the at least one light source. The first correlation information indicates a relationship between the temperature of the light source and spectral information about the light beam output from the light source. The second correlation information indicates a relationship between the spectral information and a light quantity of the light beam at the light output unit. The processor is configured to: calculate a variation in the spectral information about the at least one light beam based on the current temperature and the first correlation information; calculate a variation in the light quantity of the at least one light beam at the light output unit, caused by a change in the spectral information, based on the variation in the spectral information and the second correlation information; and calculate a light-quantity correction amount for the at least one light source based on the variation in the light quantity and the current light quantity. The image processor configured to correct a signal value of each color in an image generated from the image signal based on the light-quantity correction amount.

Another aspect of the present invention provides a color-balance correction method for correcting a light quantity of a light beam output from a light source. The light source is one of a plurality of light sources that respectively output a plurality of light beams having different spectra from each other, and the light beam output from the light source travels through at least one optical filter having specific spectral transmission properties. The color-balance correction method includes: detecting a current temperature of the light source; detecting a current light quantity of the light beam before traveling through the at least one optical filter; calculating a variation in spectral information about the light beam based on the current temperature and first correlation information indicating a relationship between the temperaafter traveling through the at least one optical filter; and calculating a light-quantity correction amount for the light source based on the variation in the light quantity and the current light quantity.

BRIEF DESCRIPTION OF DRAWINGS

FIG. 13 illustrates another example of the first correlation information.

DESCRIPTION OF EMBODIMENTS

First Embodiment

A light source device 1 according to a first embodiment of the present invention will now be described with reference to the drawings.

Figure 1:
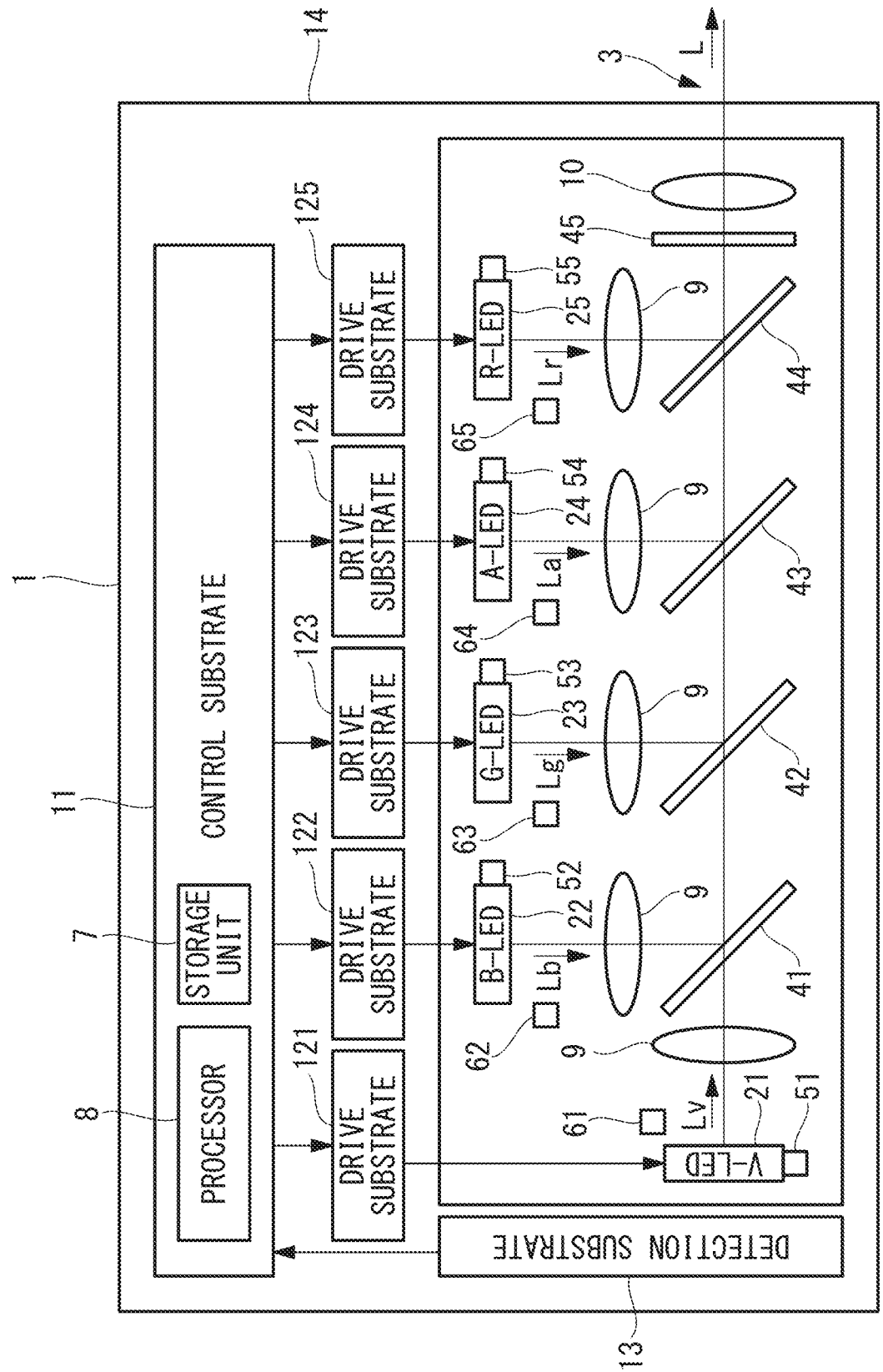
FIG. 1 illustrates the overall configuration of a light source device according to a first embodiment of the present invention.

As shown in FIG. 1, the light source device 1 according to this embodiment includes a plurality of light sources 21, 22, 23, 24, and 25, a light output unit 3, a plurality of optical filters 41, 42, 43, 44, and 45, a plurality of temperature sensors 51, 52, 53, 54, and 55, a plurality of light quantity sensors 61, 62, 63, 64, and 65, a storage unit 7, and a processor 8.

The plurality of light sources 21, 22, 23, 24, and 25 respectively output a plurality of light beams Lv, Lb, Lg, La, and Lr having different spectra from one another. In this embodiment, the plurality of light sources 21, 22, 23, 24, and 25 are five LEDs respectively outputting violet (V), blue (B), green (G), amber (A), and red (R) light beams Lv, Lb, Lg, La, and Lr. The center wavelengths of the V light beam Lv, the B light beam Lb, the G light beam Lg, the A light beam La, and the R light beam Lr are 415 nm, 455 nm, 575 nm, 600 nm, and 630 nm, respectively. A center wavelength refers to a peak wavelength when each light beam has one peak wavelength, or refers to a peak wavelength corresponding to the maximum relative intensity among multiple peak wavelengths when each light beam has multiple peak wavelengths.

The number of light sources may be an arbitrary value of 2 or more.

Optical axes of a B-LED 22, a G-LED 23, an A-LED 24, and an R-LED 25 are parallel to one another and intersect with an optical axis of a V-LED 21. The four LEDs 22, 23, 24, and 25 are arranged in the order of the wavelengths, such that the B-LED 22 with the shortest wavelength is disposed closer toward the V-LED 21.

The light output unit 3 is disposed in the optical axis of the V-LED 21 or in the extension of the optical axis, and outputs illumination light L, generated from the plurality of light beams Lv, Lb, Lg, La, and Lr, to the outside of the light source device 1.

In one example, the light output unit 3 is a hole that is disposed in a housing 14 covering the components of the light source device 1 and that is provided for outputting the light from the light sources to the outside of the housing 14. The hole may have any shape, such as a circular shape or a polygonal shape, so long as the hole can output the light to the outside. If the light source device 1 is, for example, a light source device for an endoscope, an optical guiding member, such as a light guide of the endoscope, may be engaged with the hole. The light guide is constituted of, for example, an optical fiber that optically guides the light from the light output unit 3 to an illumination optical system at the distal end of the endoscope.

The optical filters include a plurality of dichroic mirrors 41, 42, 43, and 44 and a special light filter 45. The optical filters 41, 42, 43, 44, and 45 have specific spectral transmission properties. From the LEDs 21, 22, 23, 24, and 25 to the light output unit 3, the light beams Lv, Lb, Lg, La, and Lr travel through one or more of the optical filters 41, 42, 43, 44, and 45.

In this description, the expression "a light beam travels through an optical filter" implies that the light beam is transmitted through the optical filter or that the light beam is reflected by the optical filter.

The dichroic mirrors 41, 42, 43, and 44 are disposed at positions where the optical axis of the V-LED 21 intersects with the optical axes of the other LEDs 22, 23, 24, and 25. The light beams Lv, Lb, Lg, La, and Lr output from the LEDs 21, 22, 23, 24, and 25 are converted into collimated light beams by lenses 9, and subsequently enter the dichroic mirrors 41, 42, 43, and 44. A lens 10 for converting the illumination light L into convergent light may be disposed between the light output unit 3 and the dichroic mirror 44 closest to the light output unit 3.

The dichroic mirrors 41, 42, 43, and 44 transmit or reflect the incident light beams Lv, Lb, Lg, La, and Lr, thereby mixing the five light beams Lv, Lb, Lg, La, and Lr.

In detail, the dichroic mirror 41 transmits the V light beam Lv and reflects the B light beam Lb. The dichroic mirror 42 transmits the V light beam Lv and the B light beam Lb, and reflects the G light beam Lg. The dichroic mirror 43 transmits the V light beam Lv, the B light beam Lb, and the G light beam Lg, and reflects the A light beam La. The dichroic mirror 44 transmits the V light beam Lv, the B light beam Lb, the G light beam Lg, and the A light beam La, and reflects the R light beam Lr.

Figure 2:
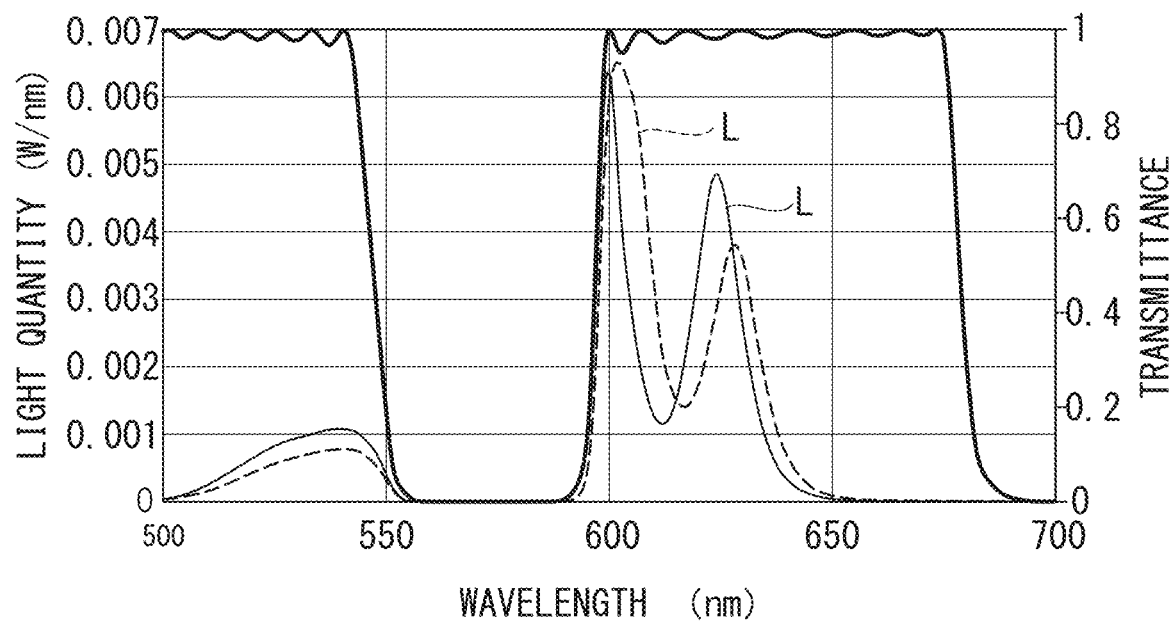
FIG. 2 illustrates spectral transmission properties of an RDI filter and a spectrum of illumination light in an RDI mode.

The special light filter 45 is an RDI filter for red dichromatic imaging (RDI), and is disposed in an optical path between the light output unit 3 and the dichroic mirror 44. As shown in FIG. 2, the RDI filter 45 has a transmission band of 485 nm to 550 nm and a transmission band of 600 nm to 680 nm, and generates the illumination light L including G, A, and R light components at least from the G light beam Lg, the A light beam La, and the R light beam Lr. The RDI filter 45 is removable from the optical path and is disposed in the optical path during the RDI mode. In FIG. 2, a solid spectrum indicates the spectrum of the illumination light L prior to a temperature change in the LEDs 23, 24, and 25, and a dashed spectrum indicates the spectrum of the illumination light L after a temperature change in the LEDs 23, 24, and 25.

Figure 3:
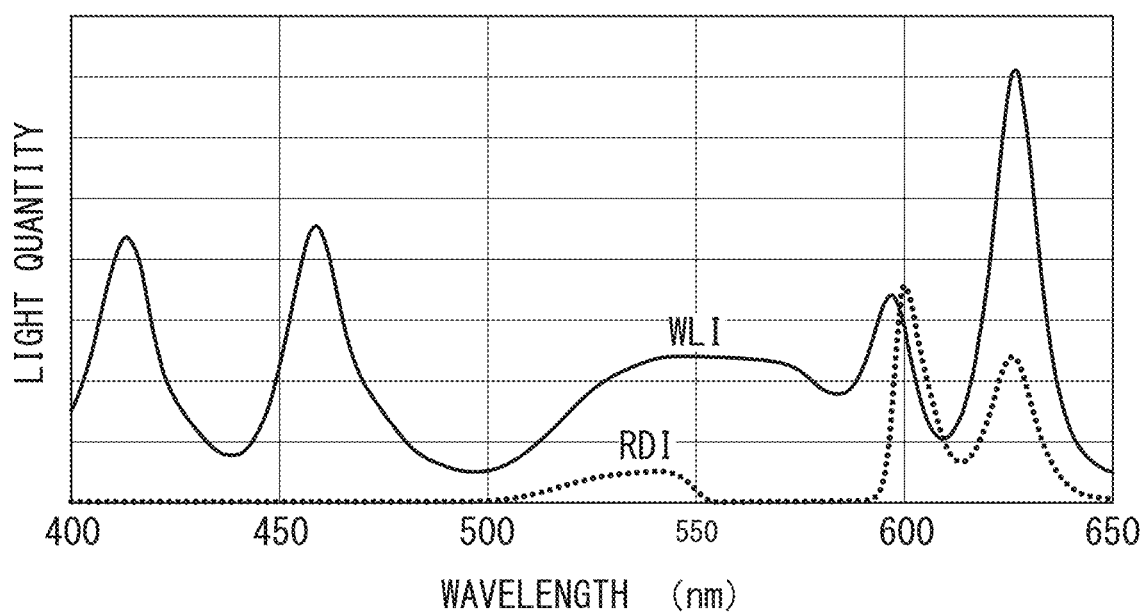
FIG. 3 illustrates spectra of the illumination light in a WLI mode and the RDI mode.

FIG. 3 illustrates an example of the spectrum of the illumination light L. In a white light imaging (WLI) mode, the RDI filter 45 is removed from the optical path, so that white illumination light L is generated. In the RDI mode, the RDI filter 45 is set in the optical path, so that the illumination light L including green, amber, and red light components is generated.

The light quantities and the spectra of the light beams Lv, Lb, Lg, La, and Lr output from the LEDs 21, 22, 23, 24, and 25 are dependent on the temperatures of the LEDs 21, 22, 23, 24, and 25. Normally, the light quantity of light output from an LED decreases with increasing temperature of the LED. Furthermore, the wavelength of light output from an LED normally shifts toward the longer wavelength side with increasing temperature of the LED. Such wavelength shifting of the light causes the quantity of light after traveling through the optical filters 41, 42, 43, 44, and 45 to change. Therefore, the color balance and the light quantity of the illumination light L change at the light output unit 3 due to a temperature change in the LEDs 21, 22, 23, 24, and 25. The color balance of the illumination light L is the light-quantity ratio between a plurality of light beams constituting the illumination light L.

Figure 4:
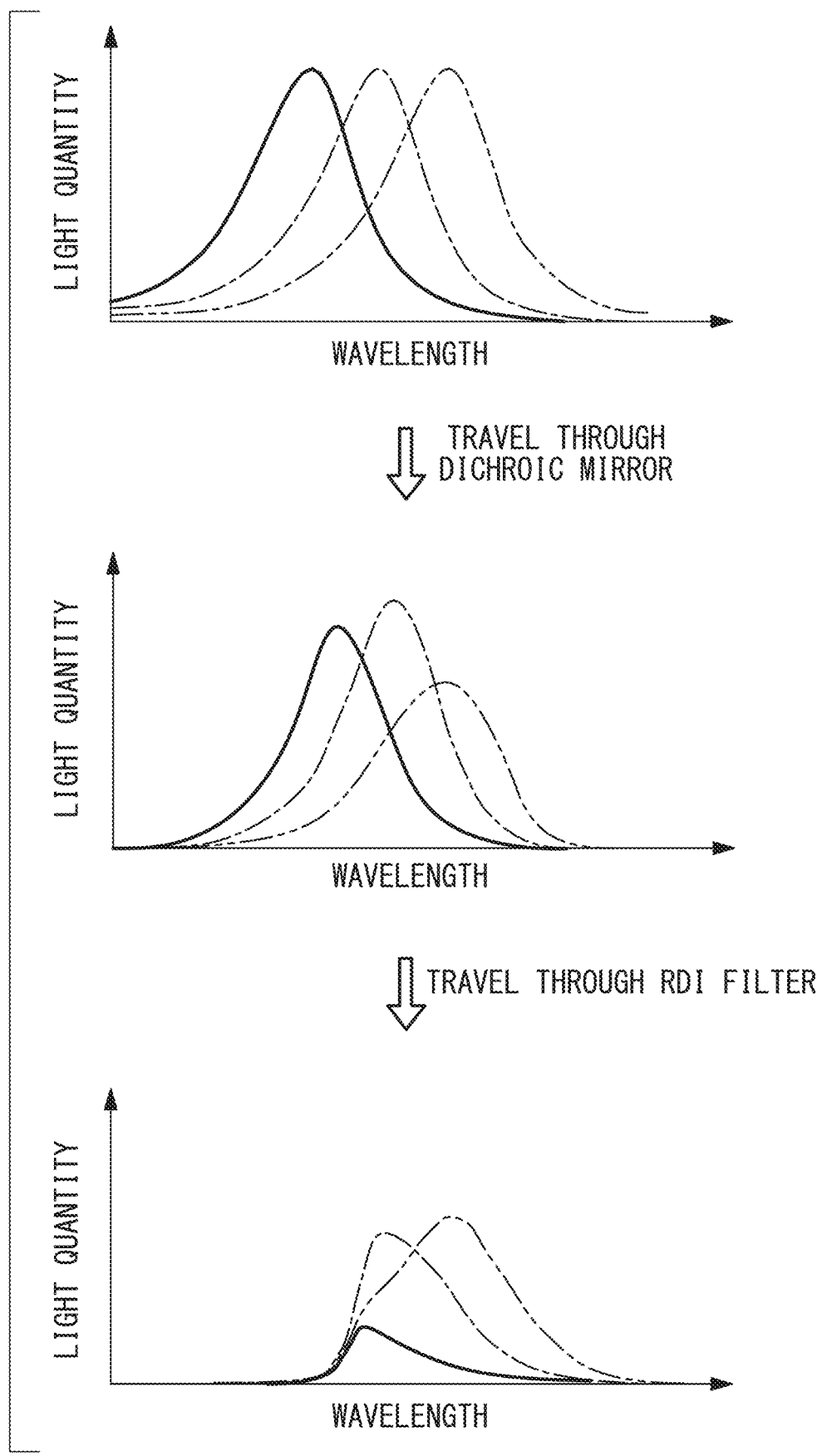
FIG. 4 illustrates changes in a spectrum of an amber light beam caused as a result of traveling through a dichroic mirror and the RDI filter.

FIG. 4 illustrates an example of changes in the spectrum of the A light beam La, due to wavelength shifting of the A light beam La with a fixed light quantity, after traveling through the dichroic mirrors 43 and 44 (middle part) and after traveling through the RDI filter 45 (lower part). The spectrum in the middle part is the spectrum of the A light beam La after being reflected at the dichroic mirror 43 and transmitted through the dichroic mirror 44.

It is apparent from FIG. 4 that the light quantity of the A light beam La after traveling through the optical filters 43, 44, and 45 changes due to wavelength shifting. For example, with regard to the dichroic mirrors 43 and 44, the light quantity of the A light beam La transmitted through the dichroic mirror 44 decreases due to wavelength shifting toward the longer wavelength side, and the light quantity of the A light beam La reflected at the dichroic mirror 43 decreases due to wavelength shifting toward the shorter wavelength side. This implies that a change in the light quantity of each of the light beams Lv, Lb, Lg, La, and Lr at the light output unit 3 due to a temperature change includes a change in the light quantity of the corresponding LED 21, 22, 23, 24, or 25 and a change in the light quantity caused by wavelength shifting.

The plurality of temperature sensors 51, 52, 53, 54, and 55 are respectively provided for the plurality of LEDs 21, 22, 23, 24, and 25, and respectively detect current temperatures Tcur of the plurality of LEDs 21, 22, 23, 24, and 25.

The plurality of light quantity sensors 61, 62, 63, 64, and 65 respectively detect current light quantities Qcur of the light beams Lv, Lb, Lg, La, and Lr output from the plurality of LEDs 21, 22, 23, 24, and 25. Each light quantity sensor 6 detects the current light quantity Qcur of the corresponding light beam Lv, Lb, Lg, La, or Lr before traveling through the corresponding optical filter 41, 42, 43, 44, or 45. Therefore, the light quantity sensors 61, 62, 63, 64, and 65 are disposed between the LEDs 21, 22, 23, 24, and 25 and the dichroic mirrors 41, 42, 43, and 44 through which the light beams from the LEDs 21, 22, 23, 24, and 25 travel first.

The light source device 1 includes a control substrate 11 that controls the LEDs 21, 22, 23, 24, and 25. The storage unit 7 and the processor 8 are equipped in the control substrate 11.

The storage unit 7 has a volatile memory, such as a RAM, and a nonvolatile storage medium, such as a ROM. The storage medium is a non-transitory computer-readable storage medium and has stored therein a color-balance correction program for causing the light source device 1 to execute a color-balance correction method, to be described later.

The storage unit 7 has stored therein first correlation information and second correlation information about each of the LEDs 21, 22, 23, 24, and 25. The first correlation information and the second correlation information are prepared for each of the LEDs 21, 22, 23, 24, and 25 and are stored in the storage unit 7.

Figure 5A:
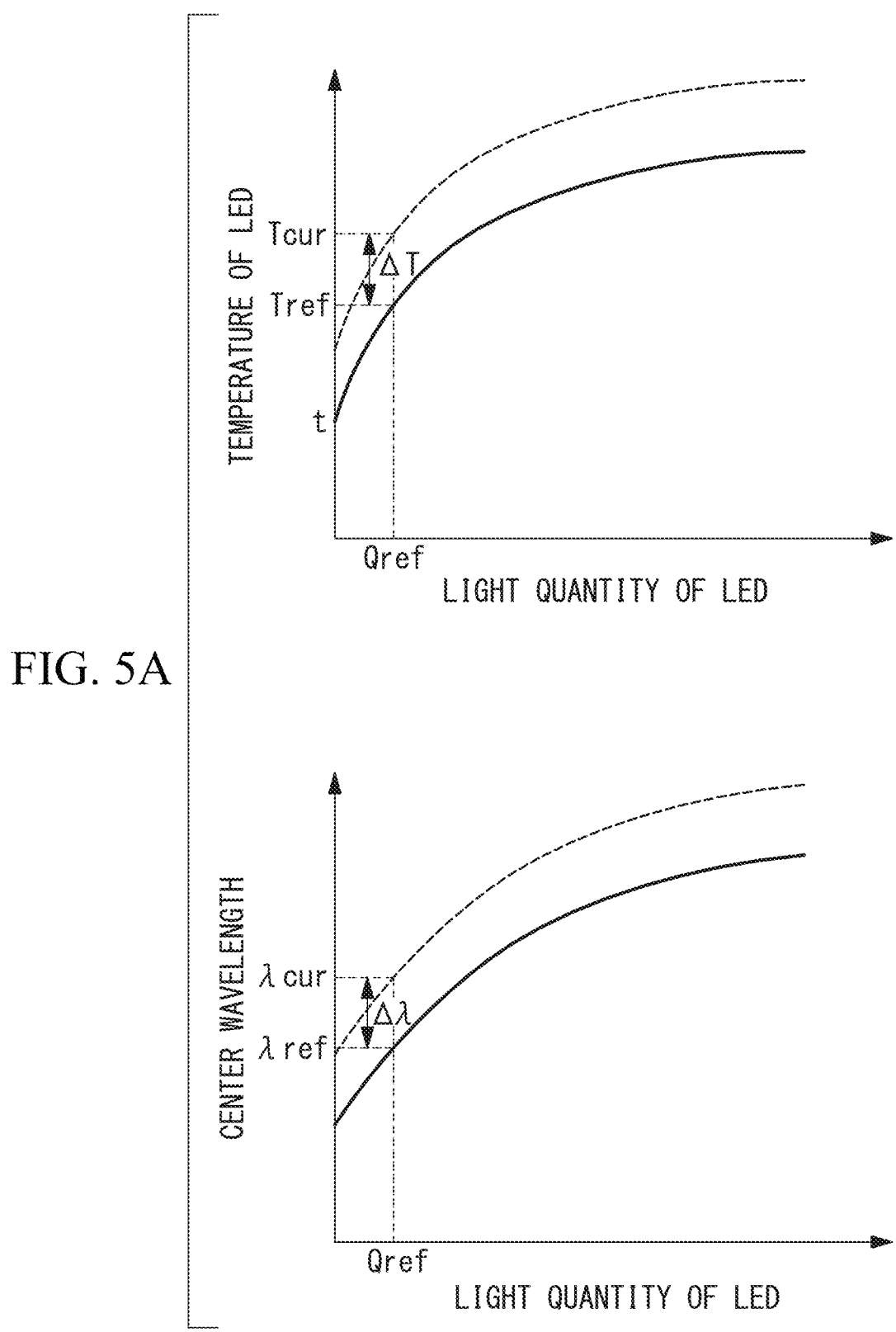
FIG. 5A is a diagram illustrating an example of first correlation information.
Figure 5B:
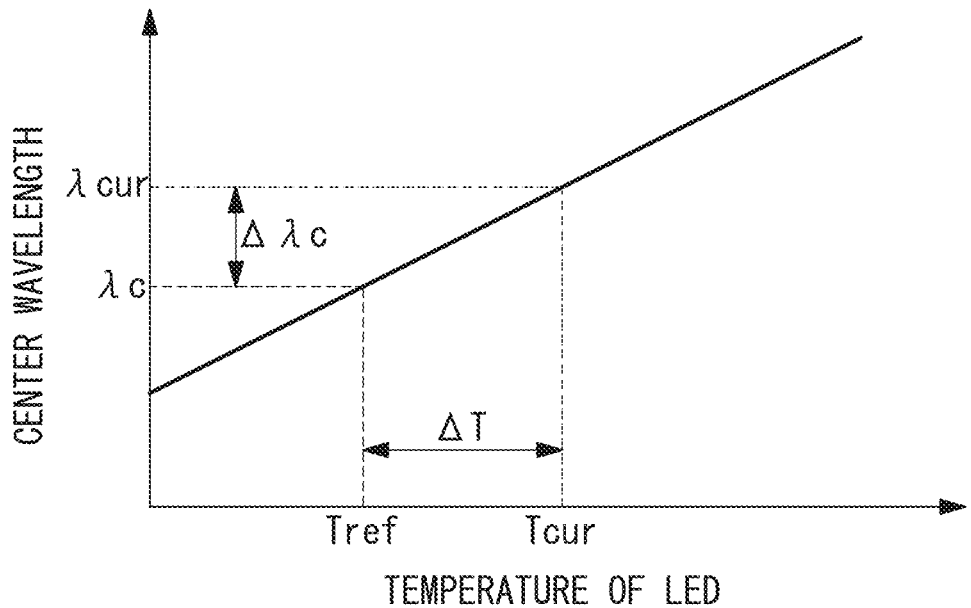
FIG. 5B is another diagram illustrating an example of the first correlation information.

As shown in FIGS. 5A and 5B, the first correlation information indicates the relationship between the temperature of the LED 21, 22, 23, 24, or 25 and spectral information about the light beam Lv, Lb, Lg, La, or Lr. The first correlation information is acquired and stored in a preparation process, to be described later.

Figure 6:
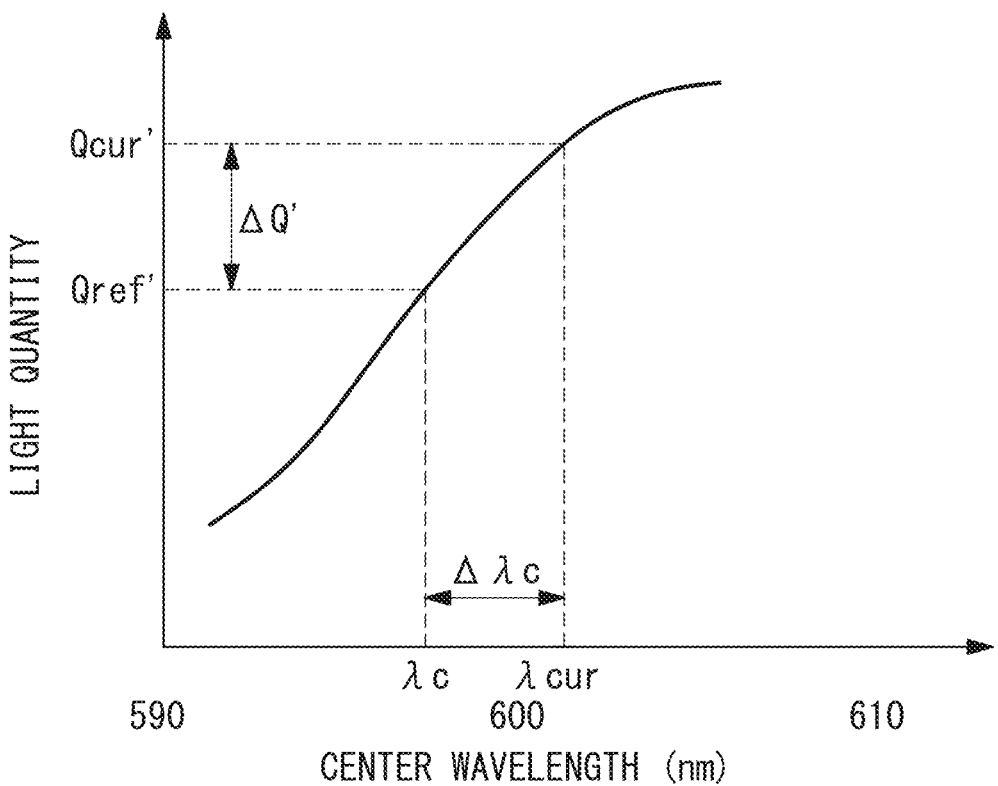
FIG. 6 illustrates an example of second correlation information.

As shown in FIG. 6, the second correlation information indicates the relationship between the spectral information about the light beam Lv, Lb, Lg, La, or Lr and the light quantity of the light beam Lv, Lb, Lg, La, or Lr at the light output unit 3. The second correlation information is obtained theoretically or experimentally. The second correlation information may be stored in the storage unit 7 as an expression indicating the relationship between the spectral information and the light quantity, or may be stored in the storage unit 7 as a table in which multiple pieces of spectral information and multiple light quantities are associated with each other.

In this embodiment, the spectral information is a center wavelength $\lambda c$ of the spectrum of the light beam Lv, Lb, Lg, La, or Lr.

Figure 7:
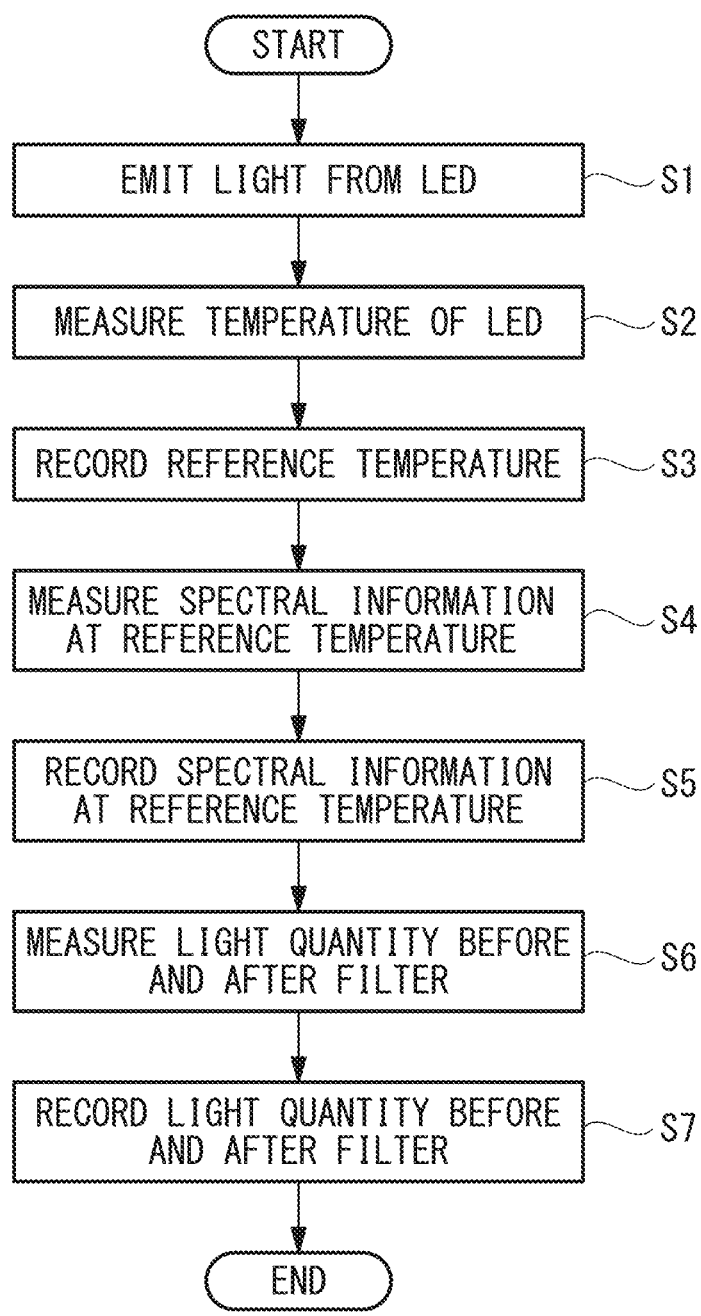
FIG. 7 is a flowchart illustrating a preparation process for acquiring the first correlation information.

FIG. 7 illustrates the preparation process for preparing the first correlation information. The preparation process is executed by an operator at a factory for each of the LEDs 21, 22, 23, 24, and 25 before or after shipment of the light source device 1.

The preparation process will be described below with reference to an example where the first correlation information of the A-LED 24 is to be prepared. The first correlation information of each of the remaining LEDs 21, 22, 23, and 25 is also prepared similarly to the first correlation information of the A-LED 24.

After causing the A-LED 24 alone to emit light (step S1), the current temperature of the A-LED 24 is measured by the temperature sensor 54 (step S2). The measured current temperature is recorded as a reference temperature Tref (step S3).

As shown in FIG. 5A, when the light quantity of the A-LED 24 (i.e., the amount of electric current supplied to the A-LED 24) increases, the value of the temperature measured by the temperature sensor 54 for the A-LED 24 also increases. Thus, the reference temperature Tref needs to be measured as the temperature when the state of a light quantity Qref (i.e., an amount of electric current supplied to the A-LED 24) is maintained.

Subsequently, the center wavelength λc of the A light beam La at the reference temperature Tref is measured (step S4), and the measured center wavelength λc is recorded (step S5).

When the light quantity of the A-LED 24 increases, as shown in FIG. 5A, the value of the center wavelength λc also increases. Therefore, the center wavelength λc is the value of the center wavelength when the state of the light quantity Qref is maintained, that is, at the reference temperature Tref.

The center wavelength λc is the center wavelength λc of the A light beam La before traveling through the optical filters 43, 44, and 45. As shown in FIG. 4, the center wavelength λc hardly changes as a result of the light beam traveling through the dichroic mirrors 43 and 44. If the center wavelength λc is the same or is substantially the same before and after the light beam travels through the dichroic mirror 44, the center wavelength λc may be measured after the light beam has traveled through the dichroic mirrors 43 and 44.

Subsequently, light quantities Qref and Qref' at the reference temperature Tref are measured (step S6), and the measured light quantities Qref and Qref' are recorded (step S7).

The light quantity Qref is the light quantity of the A light beam La before traveling through the optical filters 43, 44, and 45, and is measured by the light quantity sensor 64.

The light quantity Qref' is the light quantity of the A light beam La after traveling through the optical filters 43, 44, and 45, and is measured at the light output unit 3 by using a special measuring device. As shown in the lower part of FIG. 4, the light quantity Qref' is the light quantity after the light beam La output from the LED 24 is affected exclusively by the spectral transmission properties of the filters 43, 44, and 45.

In step S2 to step S7, the center wavelength λc and the light quantity Qref' at the reference temperature Tref are obtained. Accordingly, as shown in FIG. 6, the temperature corresponding to the light quantity Qref' is set as the reference temperature Tref in the second correlation information.

The center wavelength λc and the light quantity Qref' are normally not measurable by a user of the light source device 1. Therefore, the above-described preparation process needs to be executed before or at the time of shipment and be stored in the storage unit 7.

The temperature of the LED 24 and the center wavelength λc are determined in accordance with an ambient temperature t and the light quantity of the LED 24. Therefore, in step S2, the ambient temperature t and the light quantity of the LED 24 are also measured, and the temperature of the LED 24 and the center wavelength λc are measured and recorded at a different light quantity of the LED 24. Accordingly, as shown in FIG. 5A, in the above-described preparation process, information indicating the correlation between the temperature of the LED 24 and the center wavelength λc at each light quantity is acquired, and information indicating a change in the center wavelength λc relative to a temperature change in the LED 24 is also acquired, as shown in FIG. 5B.

The processor 8 has hardware, such as a central processing unit. The processor 8 is connected to the LEDs 21, 22, 23, 24, and 25 via drive substrates 121, 122, 123, 124, and 125, and is connected to the sensors 51, 52, 53, 54, 55, 61, 62, 63, 64, and 65 via a detection substrate 13. The drive substrates 121, 122, 123, 124, and 125 supply electric current to the LEDs 21, 22, 23, 24, and 25 to cause the LEDs 21, 22, 23, 24, and 25 to emit light.

The processor 8 controls the amounts of electric current supplied to the LEDs 21, 22, 23, 24, and 25 respectively by the drive substrates 121, 122, 123, 124, and 125 based on the current temperatures Tcur and the current light quantities Qcur, so as to correct the light quantities of the light beams Lv, Lb, Lg, La, and Lr output from the LEDs 21, 22, 23, 24, and 25, thereby correcting the color balance and the light quantity of the illumination light L.

Next, the color-balance correction method executed by the light source device 1 will be described.

Figure 8:
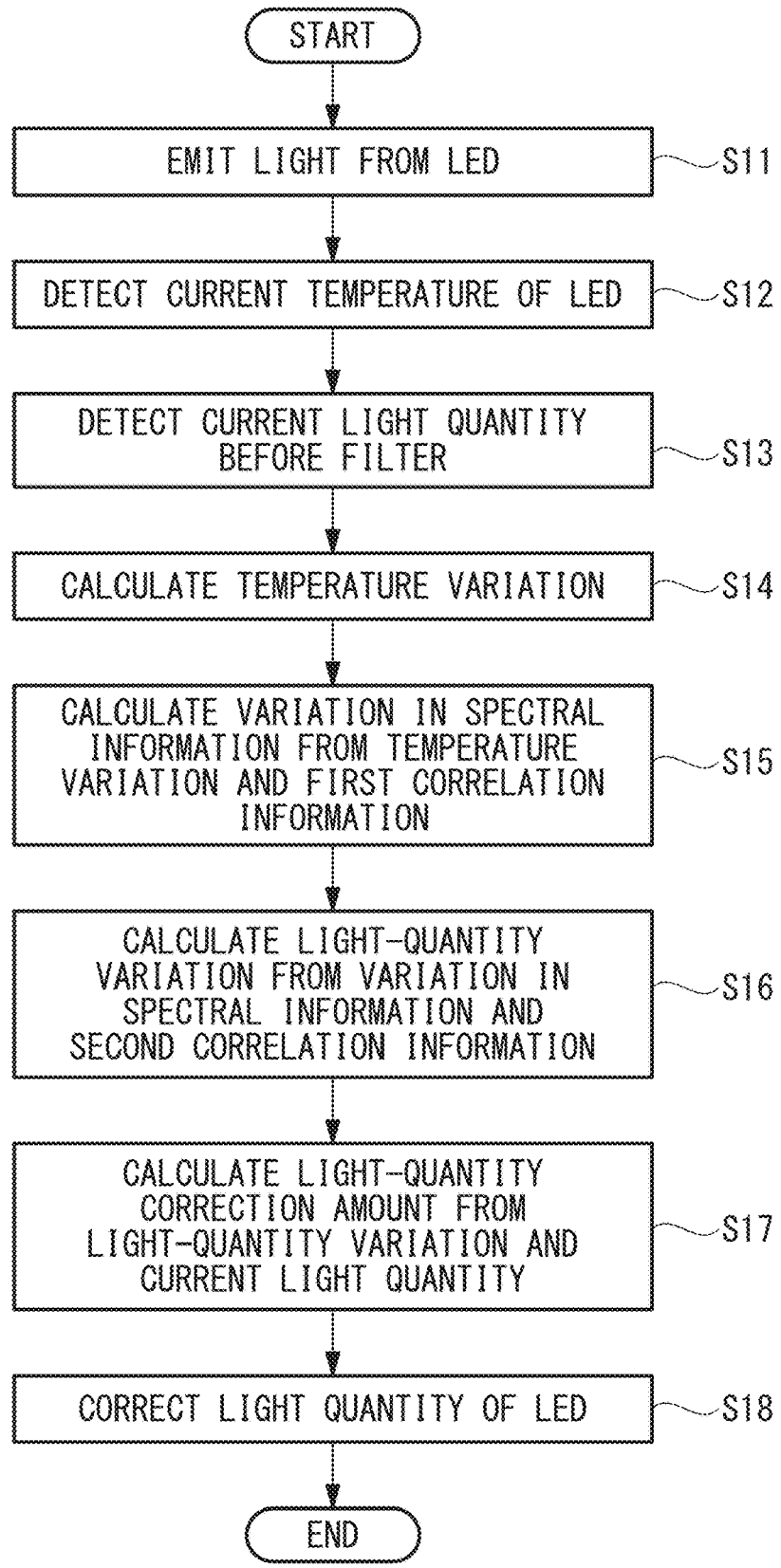
FIG. 8 is a flowchart illustrating a color-balance correction method executed by the light source device in FIG. 1.

As shown in FIG. 8, after the LEDs 21, 22, 23, 24, and 25 start emitting light (step S11), steps S12 to S18 are executed for the LEDs 21, 22, 23, 24, and 25, so that the light quantities of the light beams Lv, Lb, Lg, La, and Lr output from the LEDs 21, 22, 23, 24, and 25 are corrected.

The following description relates to a case where the light quantity of the A light beam La is corrected. The light quantities of the remaining light beams Lv, Lb, Lg, and Lr are corrected similarly to the light quantity of the A light beam La.

The color-balance correction method includes step S12 for causing the temperature sensor 54 to detect the current temperature Tcur of the A-LED 24, step S13 for causing the light quantity sensor 64 to detect the current light quantity Qcur of the A light beam La before traveling through the optical filters 43, 44, and 45, step S14 for calculating a temperature variation ΔT in the current temperature Tcur from the reference temperature Tref, step S15 for calculating a shift amount Δλc of the center wavelength λc of the A light beam La based on the temperature variation ΔT and the first correlation information, step S16 for calculating a variation ΔQ' in a light quantity Q' of the light beam La at the light output unit 3 based on the shift amount Δλc and the second correlation information, step S17 for calculating a light-quantity correction amount of the A-LED 24 based on the variation ΔQ' and the current light quantity Qcur, and step S18 for correcting the light quantity of the A light beam La output from the A-LED 24 based on the light-quantity correction amount.

After the LEDs 21, 22, 23, 24, and 25 start emitting light (step S1), the current temperature Tcur and the current light quantity Qcur of the A-LED 24 are detected by the sensors 54 and 64, respectively (steps S12 and S13). The processor 8 acquires the current temperature Tcur and the current light quantity Qcur from the sensors 54 and 64.

Then, the processor 8 calculates the temperature variation ΔT in the current temperature Tcur from the reference temperature Tref (step S14), and calculates the shift amount Δλc of the center wavelength λc based on the temperature variation ΔT and the first correlation information (step S15). As shown in FIG. 5B, the shift amount Δλc is a variation in the center wavelength λc caused by a change in the temperature of the LED 24 from the reference temperature Tref to the current temperature Tcur.

Subsequently, the processor 8 calculates the variation ΔQ' in the light quantity of the A light beam La at the light output unit 3 based on the shift amount Δλc and the second correlation information (step S16). As shown in FIG. 6, the light-quantity variation ΔQ' is a variation in the light quantity Q' caused by a change in the center wavelength λc by the shift amount Δλc. Specifically, the light-quantity variation ΔQ' does not include a change in the light quantity Q of the A-LED 24 caused by a temperature change, and is a variation caused only by wavelength shifting and the spectral transmission properties of the optical filters 43, 44, and 45.

Subsequently, the processor 8 calculates the light-quantity correction amount of the A-LED 24 from the light-quantity variation ΔQ' and the current light quantity Qcur.

For example, the processor 8 calculates the variation ΔQ of the current light quantity Qcur from the light quantity Qref at the reference temperature Tref, and calculates a sum of the variation ΔQ and the light-quantity variation ΔQ' as a light-quantity correction amount. The light-quantity correction amount is the total variation in the light quantity of the A light beam La at the light output unit 3 caused by a change in the temperature of the A-LED 24 from the reference temperature Tref to the current temperature Tcur.

Subsequently, the processor 8 controls the drive substrate 124, so as to change the light quantity of the A light beam La output from the A-LED 24 by the light-quantity correction amount. Accordingly, the light quantity of the A light beam La at the light output unit 3 is corrected to a predetermined target light quantity. For example, if the light quantity of the A light beam La at the light output unit 3 has increased from the predetermined target light quantity by the light-quantity correction amount due to a temperature increase in the A-LED 24, the processor 8 reduces the amount of electric current supplied to the A-LED 24 by an amount corresponding to the light-quantity correction amount, thereby reducing the light quantity of the A light beam La at the light output unit 3 to the target light quantity.

The processor 8 executes steps S11 to S18 for all of the LEDs 21, 22, 23, 24, and 25, so as to correct the light quantities of all of the light beams Lv, Lb, Lg, La, and Lr at the light output unit 3 to the respective target light quantities. Accordingly, the color balance and the light quantity of the illumination light L output from the light output unit 3 are maintained to a predetermined color balance and a predetermined light quantity regardless of a temperature change in the LEDs 21, 22, 23, 24, and 25.

Accordingly, in this embodiment, variations Δλc in the spectral information about the light beams Lv, Lb, Lg, La, and Lr due to a temperature change are predicted from the current temperatures Tcur of the LEDs 21, 22, 23, 24, and 25 by using the first correlation information. Then, by using the second correlation information, the light-quantity variations ΔQ' in the light beams Lv, Lb, Lg, La, and Lr at the light output unit 3 due to wavelength shifting and the spectral transmission properties of the optical filters 41, 42, 43, 44, and 45 are predicted from the variations Δλc.

By using the variations ΔQ' predicted in this manner, the light quantities of the light beams Lv, Lb, Lg, La, and Lr output from the LEDs 21, 22, 23, 24, and 25 are corrected in view of the spectral transmission properties of the optical filters 41, 42, 43, 44, and 45 through which the light beams Lv, Lb, Lg, La, and Lr travel, so that the color balance and the light quantity of the illumination light L can be kept constant regardless of a temperature change.

Furthermore, according to this embodiment, instead of using the current temperature Tcur and an absolute value of the spectral information, the temperature variation ΔT and the variation Δλc in the spectral information estimated therefrom may be used, so that the color balance can be appropriately corrected without taking into consideration the individual differences among the LEDs 21, 22, 23, 24, and 25 and the light source device 1.

In the above embodiment, at least one of the dichroic mirrors 41, 42, 43, and 44 preferably has a low-cut function against light traveling therethrough. Alternatively, if there is a mixture of a low-cut function and a high-cut function, it is preferable that the degree of contribution of the low-cut function be higher than the degree of contribution of the high-cut function. In other words, a higher degree of contribution implies that a wavelength difference between the center wavelength λc and a cutoff wavelength λcut is small.

Figure 9A:
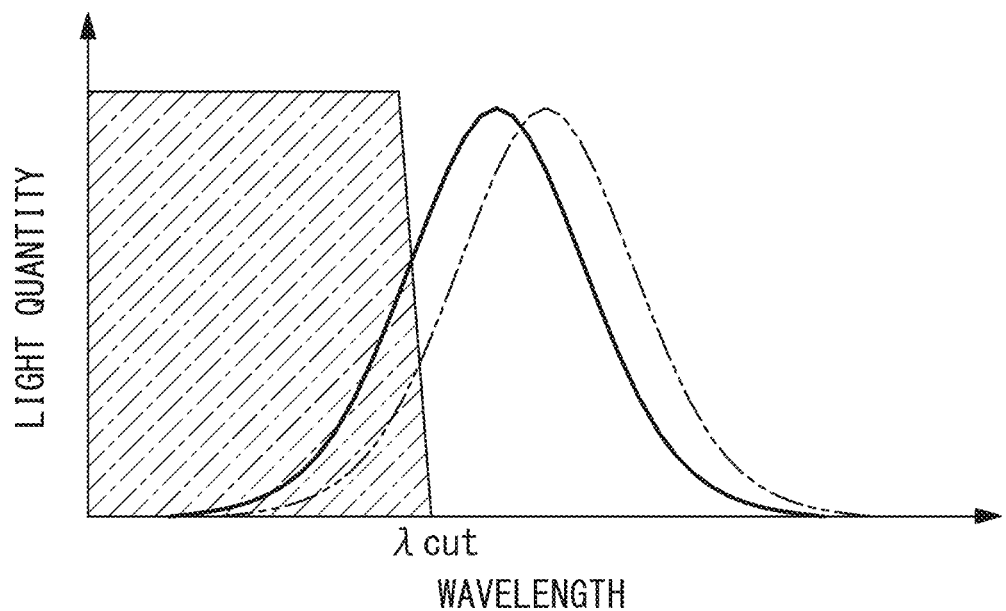
FIG. 9A illustrates a low-cut function of the dichroic mirror.
Figure 9B:
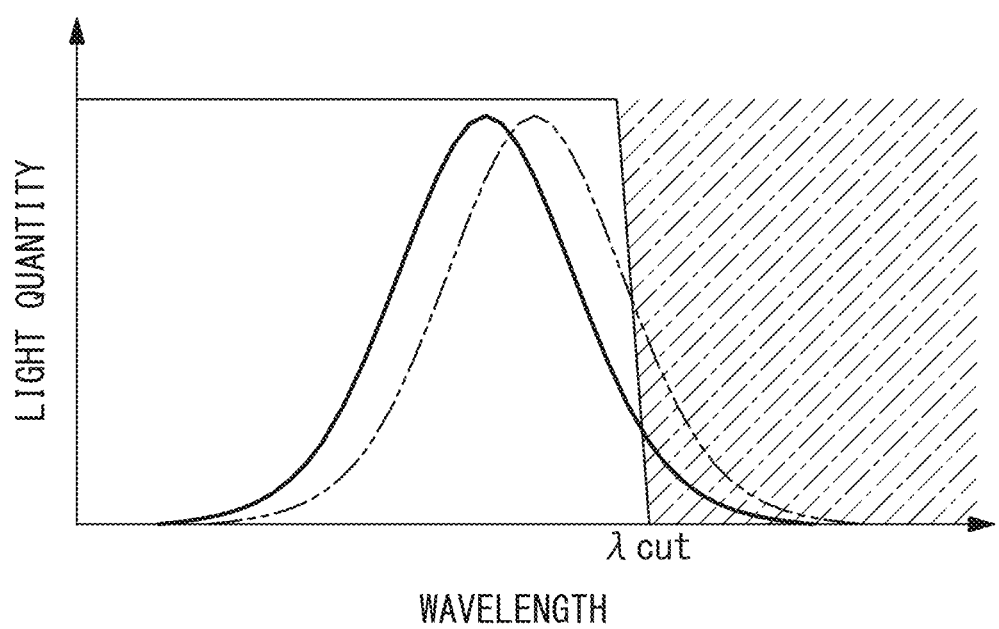
FIG. 9B illustrates a high-cut function of the dichroic mirror.
Figure 9C:
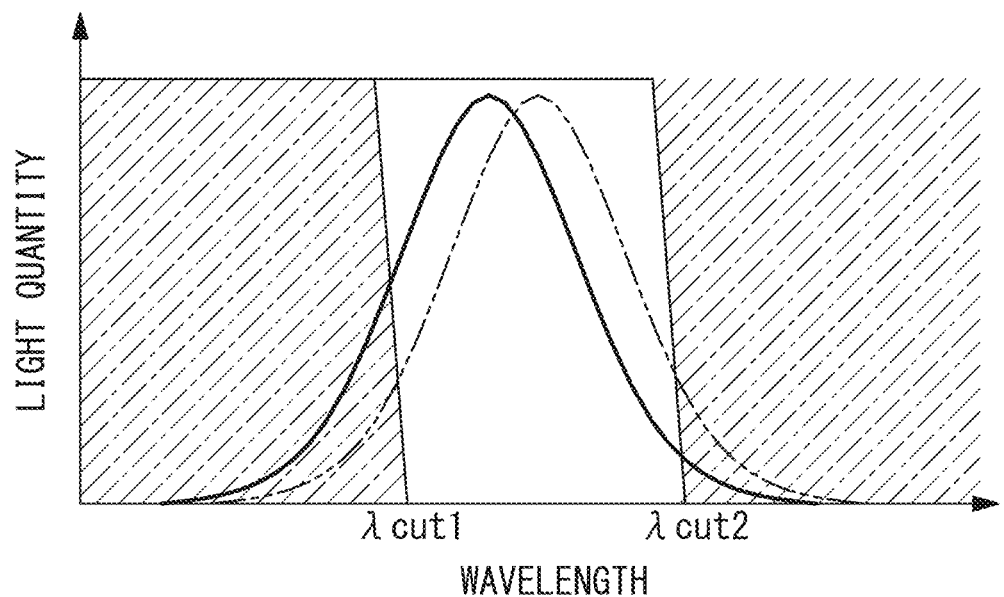
FIG. 9C illustrates a state where the dichroic mirror has a mixture of the low-cut function and the high-cut function.

FIG. 9A illustrates the low-cut function of a dichroic mirror, and FIG. 9B illustrates the high-cut function of a dichroic mirror. FIG. 9C illustrates a state where the degree of contribution of the low-cut function is higher than the degree of contribution of the high-cut function in a case where there is a mixture of the low-cut function and the high-cut function. In FIGS. 9A, 9B, and 9C, a solid spectrum indicates the spectrum before a temperature increase, and a double-dashed spectrum indicates the spectrum after a temperature increase.

As shown in FIG. 9A, the dichroic mirror with the low-cut function has a pass band and a cutoff band at the shorter wavelength side of the pass band. In FIGS. 9A, 9B, and 9C, the cutoff band is the hatched wavelength band. The dichroic mirror reflects light having a wavelength within the pass band to allow the light to travel toward the light output unit 3, and cuts off light having a wavelength within the cutoff band. A cutoff wavelength λcut at the boundary between the pass band and the cutoff band is disposed toward the shorter wavelength side relative to the center wavelength of the light incident on the dichroic mirror.

On the other hand, as shown in FIG. 9B, the dichroic mirror with the high-cut function has a pass band and a cutoff band at the longer wavelength side of the pass band. The cutoff wavelength λcut is disposed toward the longer wavelength side relative to the center wavelength of the light incident on the dichroic mirror.

As shown in FIG. 9C, when there is a mixture of the low-cut function and the high-cut function, a wavelength difference between a first cutoff wavelength λcut1 of the low-cut function and the center wavelength is smaller than a wavelength difference between a second cutoff wavelength λcut2 of the high-cut function and the center wavelength. The mixture of the low-cut function and the high-cut function is realized by, for example, a combination of a dichroic mirror having the low-cut function and a dichroic mirror having the high-cut function.

Figure 10:
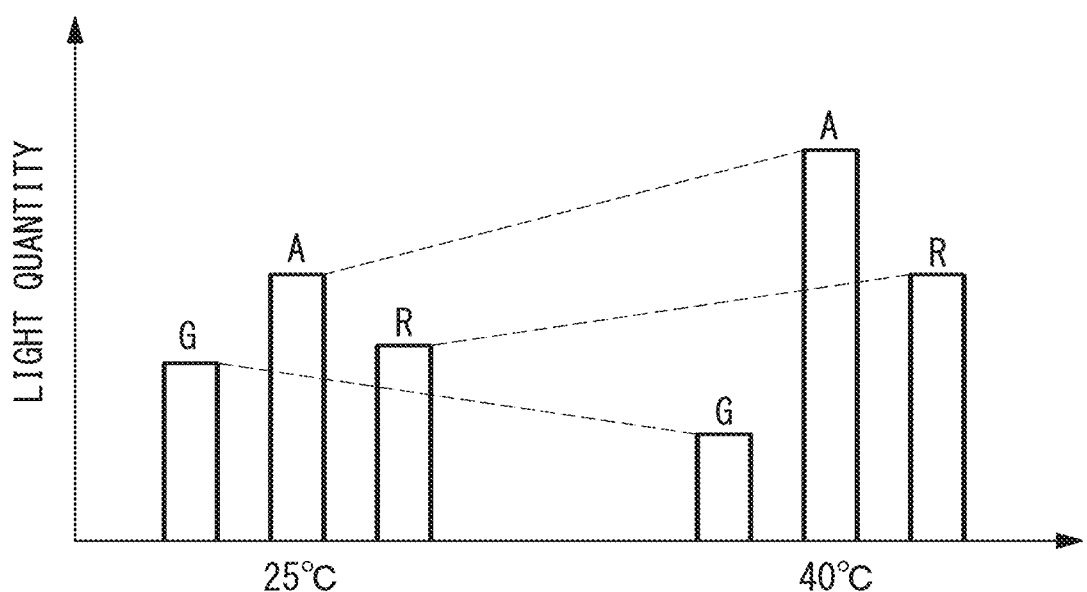
FIG. 10 illustrates changes in light quantities of green, amber, and red light beams caused by a temperature increase in LEDs.

FIG. 10 illustrates changes in the light quantities at the light output unit 3 caused by wavelength shifting when the dichroic mirror 42 for the G light beam Lg has the high-cut function and the dichroic mirrors 43 and 44 for the A light beam La and the R light beam Lr each have the low-cut function.

In the case of the high-cut function, the light quantity of the G light beam Lg after traveling through the dichroic mirror 42 decreases due to wavelength shifting caused by a temperature increase in the G-LED 23, thus causing the light quantity at the light output unit 3 to further decrease. Consequently, the required amount of electric current supplied to the G-LED 23 for correcting the color balance increases, thus requiring a large drive substrate 123 with a large variable range of the electric current.

On the other hand, in the case of the low-cut function, the light quantities of the A light beam La and the R light beam Lr after traveling through the dichroic mirrors 43 and 44 increase due to wavelength shifting caused by a temperature increase in the LEDs 24 and 25, so that the decrease in the light quantity at the light output unit 3 is reduced. Consequently, the required amount of electric current supplied to the LEDs 24 and 25 for correcting the color balance is reduced, thus allowing for the use of a small drive substrate with a small variable range of the electric current.

It is particularly preferable that the low-cut function be applied to a light beam with large contribution to the light quantity of the illumination light L.

For example, as shown in FIG. 3, in the RDI mode, the contribution of the A light beam La and the R light beam Lr to the light quantity is large, whereas the contribution of the G light beam Lg to the light quantity is small. Therefore, the dichroic mirrors 43 and 44 preferably have a low-cut function against the A light beam La and the R light beam Lr.

In the case of the low-cut function, a large light quantity is obtained at the light output unit 3 in accordance with a small amount of electric current. Therefore, the LEDs 24 and 25 with small light quantities can be used.

Figure 11:
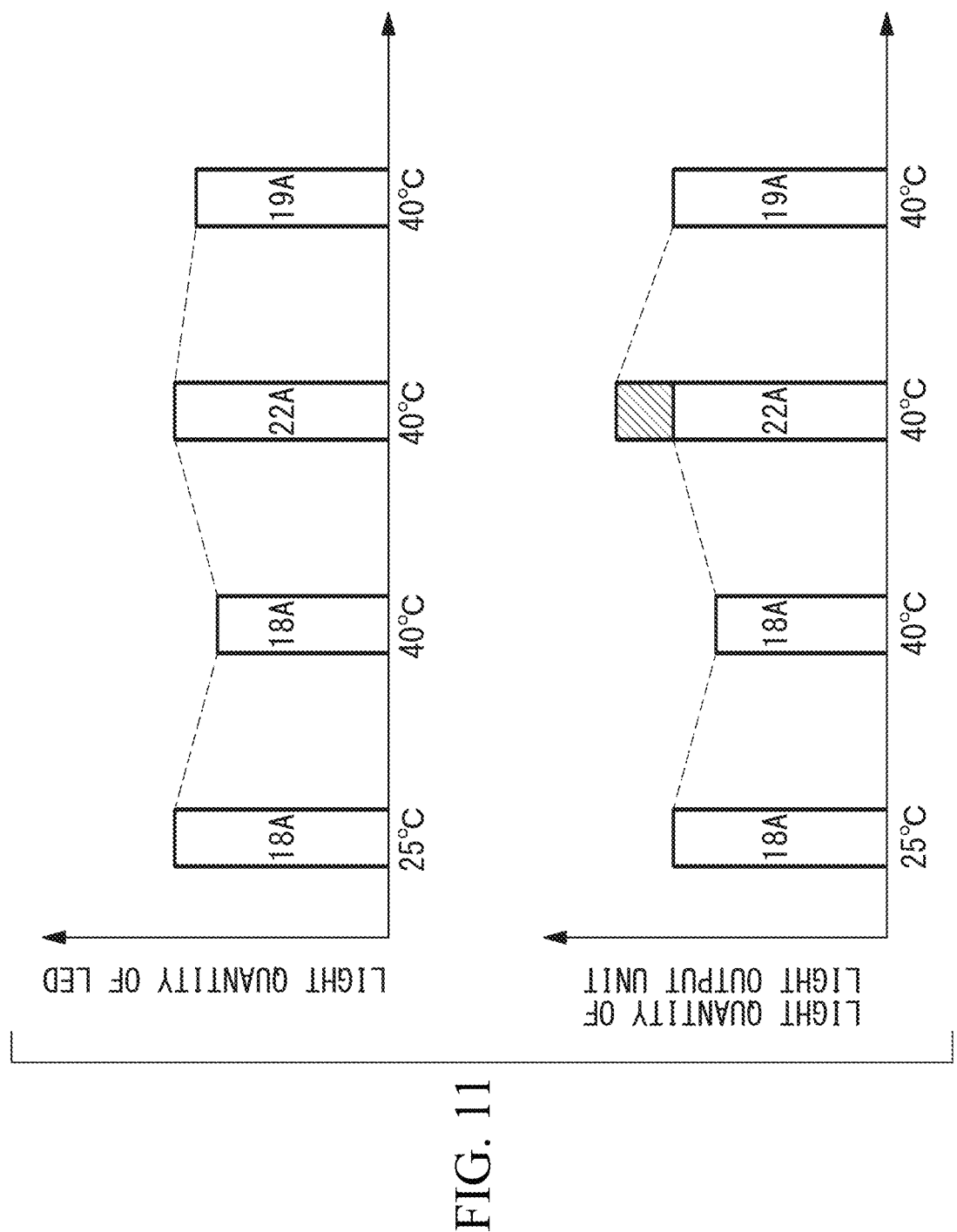
FIG. 11 illustrates an amount of electric current supplied to the LEDs for color-balance correction.

FIG. 11 illustrates changes in the electric current supplied to the LEDs 24 and 25 due to a temperature increase.

For example, when the temperature of the LED 24 increases from 25° C. to 40° C., the light quantity of the A light beam La output from the LED 24 decreases.

Supposing that the light quantity of the A light beam La output from the LED 24 is increased by an amount of decrease in the light quantity Qcur detected by the temperature sensor 54, the electric current supplied to the LED 24 is increased from, for example, 18 A to 22 A.

If the dichroic mirror 43 has the high-cut function, the light quantity of the A light beam La traveling through the dichroic mirror 43 increases due to a temperature increase. Therefore, when the electric current is increased to 22 A, the light quantity of the A light beam La at the light output unit 3 becomes larger than the target light quantity at 25° C. Specifically, the amount of electric current supplied to the LED 24 becomes excessive. Thus, the electric current for correcting the light quantity of the A light beam La at the light output unit 3 to the target light quantity is smaller than 22 A. For example, an electric current of 19 A is sufficient.

Accordingly, in the case where the dichroic mirrors 43 and 44 have the high-cut function, the range of the electric current for compensating for a change in the light quantity at the light output unit 3 caused by a temperature increase is within the variable range of the electric current when the light quantities of the light beams La and Lr output from the LED 24 are to be increased by the amount of decrease in the current light quantities Qcur detected by the temperature sensors 54 and 55.

Likewise, the range of the electric current for compensating for a change in the light quantity at the light output unit 3 caused by a temperature decrease is within the variable range of the electric current when the light quantities of the light beams La and Lr output from the LED 24 are to be decreased by the amount of increase in the current light quantities Qcur detected by the temperature sensors 54 and 55.

Therefore, electric current that exceeds the variable range of a drive substrate in the related art does not need to be supplied to the LEDs 24 and 25, so that the drive substrate in the variable range in the related art can be used.

As an alternative to the above embodiment where the spectral information is the center wavelength λc, the spectral information may include at least one of the wavelength width and the shape of the spectrum in addition to the center wavelength λc.

Figure 12:
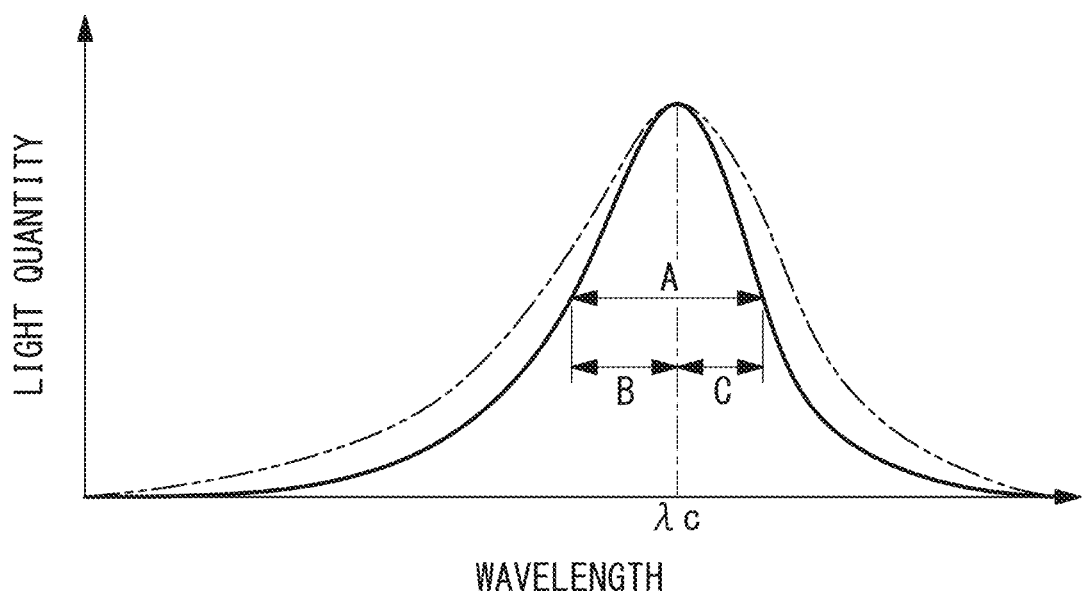
FIG. 12 illustrates the wavelength width and shape of a spectrum as spectral information.

As shown in FIG. 12, a temperature change in an LED causes a change in not only the center wavelength λc but also a wavelength width A and the shape of the spectrum.

The shape of the spectrum is expressed by, for example, a ratio between a first wavelength width B and a second wavelength width C. The first wavelength width B is the wavelength width at the shorter wavelength side of the center wavelength λc, and the second wavelength width C is the wavelength width at the longer wavelength side of the center wavelength λc. Depending on the condition, the first wavelength width B and the second wavelength width C may change without a change in the wavelength width A.

The quantity of light after traveling through the RDI filter 45 is brought about not only by shifting of the center wavelength λc but also by a change in the wavelength width A, B, or C. The color balance can be corrected in view of these factors in accordance with a similar correction method.

FIG. 13 illustrates an example of the first correlation information in a case where the color balance is corrected in view of all changes in the center wavelength λc and a wavelength width W (wavelength width A, B, C).

The temperature of each LED, the center wavelength λc, and the wavelength width are determined in accordance with the light quantity of the LED and the ambient temperature. Therefore, as shown in FIG. 13, in each of multiple states 1, 2, 3, 4, and so on with different LED light quantities and different ambient temperatures, the LED temperature, the center wavelength, and the wavelength width are measured and recorded, and a table or a relational expression about the multiple states 1, 2, 3, 4, and so on is stored in the storage unit 7. The light source device 1 may further be provided with a temperature sensor for detecting the ambient temperature t.

The ambient temperature, the LED temperature, and the light quantity are values that can be measured by the user when using the light source device 1. On the other hand, the center wavelength, the wavelength width, and the quantity of light after traveling through an optical filter are values that cannot be measured by the user and that can only be measured before or at the time of factory shipment.

In this modification, the center wavelength λc and the wavelength width W are estimated from the ambient temperature t, the LED temperature Tcur, and the light quantity Qcur by using the first correlation information, and the light quantity Q' at the light output unit 3 is estimated from the estimated center wavelength λc and the estimated wavelength width W by using the second correlation information. In detail, variations Δt, ΔT, and ΔQ from reference values of the current ambient temperature t, the current temperature Tcur, and the current light quantity Qcur are calculated. Then, variations Δλc and AW in the center wavelength λc and the wavelength width W are estimated from these variations Δt, ΔT, and ΔQ. A light-quantity variation ΔQ' at the light output unit 3 is estimated from the variations Δλc and ΔW.

Second Embodiment

Next, a light source device and an observation system according to a second embodiment of the present invention will be described.

A change in the color balance of the illumination light L causes the apparent color of a subject S illuminated with the illumination light L to change. This embodiment is different from the first embodiment in that the apparent color balance of the illumination light L in an image is corrected by correcting the color of the image based on the light-quantity correction amount.

In this embodiment, components different from those in the first embodiment will be described. Components identical to those in the first embodiment will be given the same reference signs, and descriptions thereof will be omitted.

Figure 14:
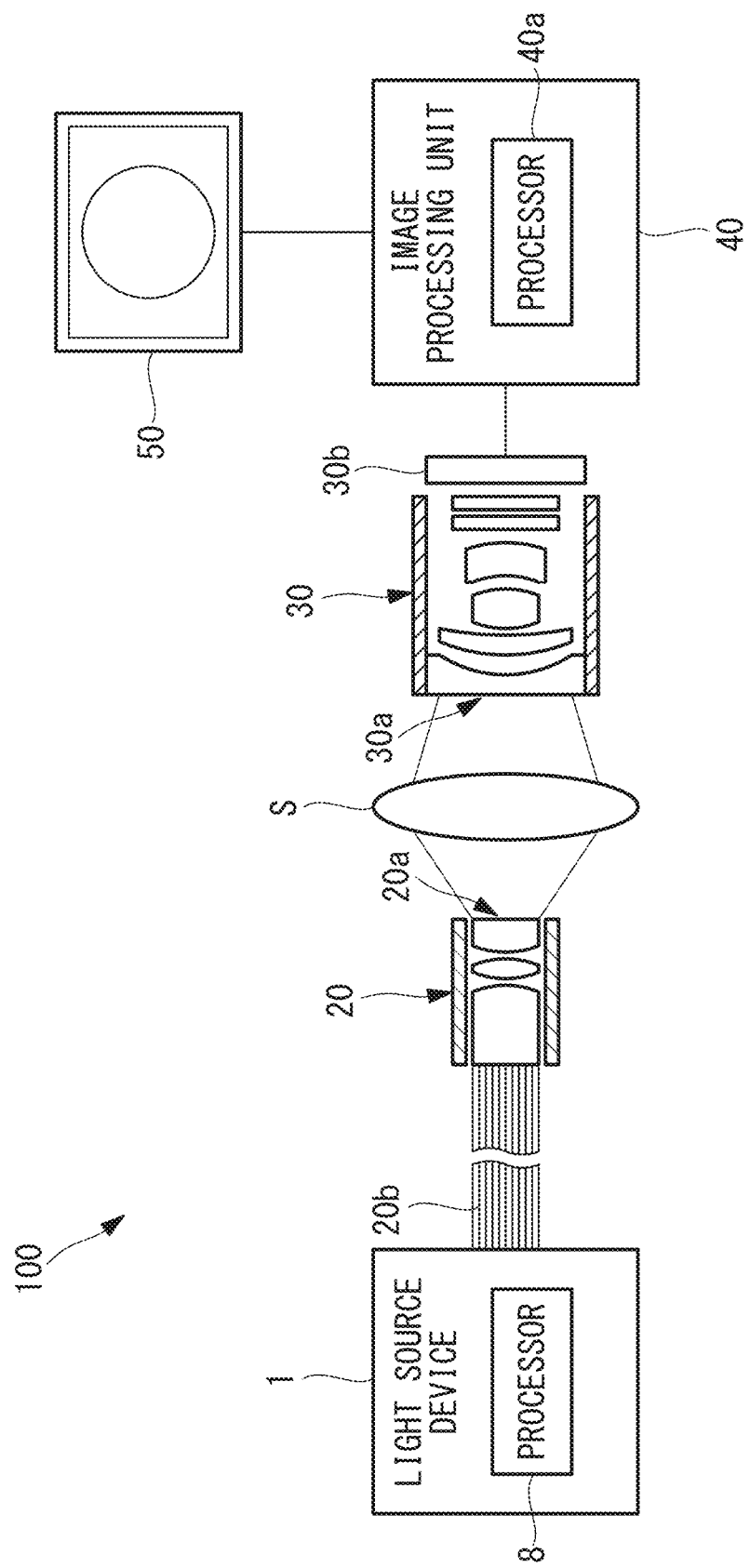
FIG. 14 illustrates the overall configuration of a light source device and an observation system according to a second embodiment of the present invention.

As shown in FIG. 14, an observation system 100 includes the light source device 1, an illumination unit 20, an imaging unit 30, and an image processing unit 40. For example, the observation system 100 is an endoscope system equipped with an endoscope or a microscope system equipped with a microscope. The illumination unit 20 and the imaging unit 30 may be provided in the endoscope or the microscope.

The illumination unit 20 includes an illumination optical system 20a connected to the light output unit 3 of the light source device 1. In FIG. 14, the illumination optical system 20a is connected to the light output unit 3 via an optical guiding member 20b, such as a light guide. The illumination optical system 20a radiates the illumination light L supplied from the light output unit 3 toward the subject S.

The imaging unit 30 includes an objective optical system 30a and an imaging element 30b. The objective optical system 30a receives light from the subject S illuminated with the illumination light L and forms an optical image of the subject S. The imaging element 30b captures the optical image of the subject S, generates an image signal of the subject S, and transmits the image signal to the image processing unit 40.

The image processing unit 40 includes a processor 40a having hardware, such as a CPU. The image processing unit 40 processes the image signal received from the imaging element 30b, so as to generate an image of the subject S. The image is transmitted from the image processing unit 40 to a display device 50, and is displayed on the display device 50.

The color and the brightness of the subject S within the image change in accordance with the color balance and the light quantity of the illumination light L. The processor 40a acquires the light-quantity correction amounts for the LEDs 21, 22, 23, 24, and 25 from the processor 8 of the light source device 1, and corrects a signal value of the image based on the light-quantity correction amounts. Accordingly, the processor 40a corrects the color and the brightness of the subject S within the image to the same color and the same brightness as when the subject S is illuminated with the illumination light L having the predetermined color balance and the predetermined light quantity.

The signal value to be corrected by the image processing unit 40 may be a RAW signal value of the imaging element 30b input to the image processing unit 40 from the imaging unit 30.

The signal value to be corrected by the image processing unit 40 may be a signal value of each pixel of an image generated from a RAW signal. The imaging element 30b has RGB primary-color filters or CMKY complementary-color filters in an image array. If the imaging element 30b has complementary-color filters, R, G, and B signal values of pixels having undergone color conversion from the complementary colors to the primary colors may be corrected. Alternatively, R, G, and B signal values of pixels having undergone de-mosaicking may be corrected.

Figure 15:
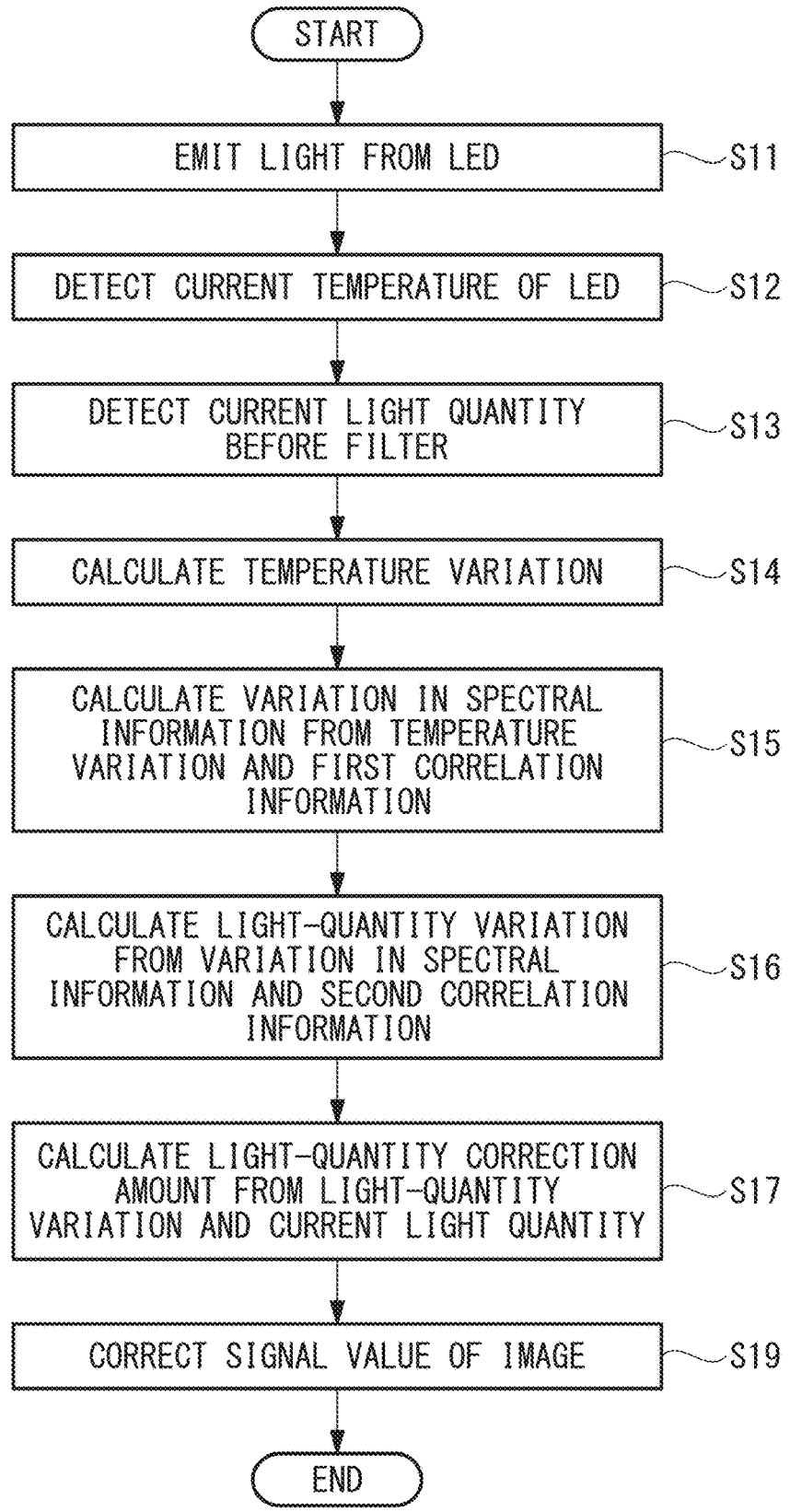
FIG. 15 is a flowchart illustrating a color-balance correction method executed by the observation system in FIG. 14.

FIG. 15 illustrates the color-balance correction method according to this embodiment.

The color-balance correction method according to this embodiment includes steps S11 to S17 described in the first embodiment, and step S19.

In step S19, the processor 40a of the image processing unit 40 calculates correction values for the respective colors of an image from the light-quantity correction amounts for the LEDs 21, 22, 23, 24, and 25 acquired from the light source device 1. For example, if the image is of an RGB type, the processor 40a calculates R, G, and B correction values. The correction values may be determined also in view of the spectral sensitivity of the imaging element 30b.

Subsequently, the processor 40a corrects an R signal value, a G signal value, and a B signal value by using the correction values, and generates an image using the corrected signal values. Accordingly, even if the color balance and the light quantity of the illumination light L change due to a temperature change in the LEDs 21, 22, 23, 24, and 25, an image with the same color and the same brightness as when the subject S is illuminated with the illumination light L having the predetermined color balance and the predetermined light quantity can be generated. Specifically, the apparent color balance and the apparent light quantity of the illumination light L can be kept constant in the image regardless of a temperature change in the LEDs 21, 22, 23, 24, and 25.

As an alternative to this embodiment in which steps S14 to S17 are executed by the processor 8 of the light source device 1, steps S14 to S17 may be executed by the processor 40a of the image processing unit 40. In this case, the first correlation information and the second correlation information are stored in a storage unit equipped in the image processing unit 40, and the image processing unit 40 acquires current temperatures T and current light quantities Q detected by the sensors 51, 52, 53, 54, 55, 61, 62, 63, 64, and 65 from the light source device 1.

Alternatively, a storage unit that stores the first correlation information and the second correlation information and a processor that executes steps S14 to S17 may be provided separately from the light source device 1 and the image processing unit 40.

As an alternative to the first and second embodiments described above in which the light-quantity correction amounts for all of the light sources 21, 22, 23, 24, and 25 are calculated, the light-quantity correction amount may be calculated only for at least one of the light sources.

Specifically, if one or more light beams output from one or more light sources travel through the optical filters, the light-quantity correction amounts for the one or more light sources may be calculated, whereas the light-quantity correction amounts for the remaining one or more light sources do not have to be calculated.

The present invention is not limited to the above embodiments, and various modifications and applications may be implemented so long as they do not depart from the gist of the invention. Moreover, the above embodiments include various stages of the invention, and various inventions may be extracted in accordance with appropriate combinations in multiple disclosed configuration requirements. For example, in a case where the problems to be solved by the invention can be solved and the advantages of the invention can be achieved even if some of the configuration requirements indicated in one of the above embodiments are deleted, the configuration from which these configuration requirements have been deleted may be extracted as an invention. Furthermore, components in different embodiments may be combined with each other, where appropriate. Other than being limited by the attached claims, this invention is not to be limited by specific embodiments.

REFERENCE SIGNS LIST 1 light source device
21, 22, 23, 24, 25 LED (light source)
3 light output unit
41, 42, 43, 44 dichroic mirror (optical filter)
45 special light filter (optical filter)

51, 52, 53, 54, 55 temperature sensor
61, 62, 63, 64, 65 light quantity sensor
7 storage unit
8 processor
20 illumination unit
30 imaging unit
40 image processing unit
40a processor
100 observation system

The invention claimed is:

1. A light source device comprising:
a plurality of light sources that respectively output a plurality of light beams having different spectra from each other;
a light output unit that comprises a hole and that externally outputs illumination light generated from the plurality of light beams;
at least one optical filter that has specific spectral transmission properties and through which at least one of the light beams output from at least one light source of the plurality of light sources travels;
at least one temperature sensor that detects a current temperature of the at least one light source;
at least one light quantity sensor that detects a current light quantity of the at least one light beam before traveling through the optical filter;
a storage; and
a processor,
wherein the storage stores first correlation information and second correlation information about the at least one light source,
wherein the first correlation information indicates a relationship between the temperature of the light source and spectral information about the light beam output from the light source,
wherein the second correlation information indicates a relationship between the spectral information and a light quantity of the light beam at the light output unit,
wherein the processor is configured to:
calculate a variation in the spectral information about the at least one light beam based on the current temperature and the first correlation information;
calculate a variation in the light quantity of the at least one light beam at the light output unit based on the variation in the spectral information and the second correlation information, the variation in the light quantity being caused by a change in the spectral information; and
calculate a light-quantity correction amount for the at least one light source based on the variation in the light quantity and the current light quantity.

2. The light source device according to claim 1, wherein the processor is configured to correct the light quantity of the light beam output from the at least one light source to a predetermined target light quantity based on the light-quantity correction amount.

3. The light source device according to claim 1, wherein the spectral information includes at least one of a center wavelength, a wavelength width, and a shape of a spectrum of the light beam output from the light source.

4. The light source device according to claim 3,
wherein the first correlation information includes the center wavelength at a reference temperature,
wherein the processor is configured to:
calculate a temperature variation between the current temperature of the at least one light source and the reference temperature;
calculate a shift amount of the center wavelength of the at least one light beam based on the temperature variation and the first correlation information; and
calculate the variation in the light quantity of the at least one light beam at the light output unit based on the shift amount and the second correlation information, the variation in the light quantity being caused by shifting of the center wavelength.

5. The light source device according to claim 1,
wherein the at least one optical filter has a low-cut function having a cutoff band at a shorter wavelength side of a pass band, the at least one optical filter allowing a light beam having a wavelength within the pass band to travel therethrough and cutting off a light beam having a wavelength within the cutoff band, and
wherein a cutoff wavelength at a boundary between the pass band and the cutoff band is disposed at a shorter wavelength side relative to a center wavelength of a light beam incident on the at least one optical filter.

6. The light source device according to claim 5, wherein the optical filter through which a light beam with largest contribution to a light quantity of the illumination light travels has the low-cut function against the light beam with the largest contribution.

7. The light source device according to claim 1,
wherein the at least one optical filter has a low-cut function having a cutoff band at a shorter wavelength side of a pass band and a high-cut function having a cutoff band at a longer wavelength side of the pass band, the at least one optical filter allowing a light beam having a wavelength within the pass band to travel therethrough and cutting off a light beam having a wavelength within the cutoff band,
wherein a first cutoff wavelength at a boundary between the pass band and the cutoff band of the low-cut function is disposed at a shorter wavelength side relative to a center wavelength of a light beam incident on the at least one optical filter,
wherein a second cutoff wavelength at a boundary between the pass band and the cutoff band of the high-cut function is disposed at a longer wavelength side relative to the center wavelength of the light beam incident on the at least one optical filter, and
wherein a wavelength difference between the first cutoff wavelength and the center wavelength is smaller than a wavelength difference between the second cutoff wavelength and the center wavelength.

8. The light source device according to claim 7, wherein the optical filter through which a light beam with largest contribution to a light quantity of the illumination light travels has the low-cut function against the light beam with the largest contribution.

9. The light source device according to claim 3, wherein the spectral information includes the center wavelength, the wavelength width, and the shape of the spectrum of the light beam.

10. An observation system comprising:
a light source device;
an imager that captures an image of a subject illuminated with illumination light output from the light source device and generates an image signal;
an image processor configured to process the image signal;
a storage; and
a processor, wherein the light source device includes:
- a plurality of light sources that respectively output a plurality of light beams having different spectra from each other;
- a light output unit that comprises a hole and that externally outputs the illumination light generated from the plurality of light beams;
- at least one optical filter that has specific spectral transmission properties and through which at least one of the light beams output from at least one light source of the plurality of light sources travels;
- at least one temperature sensor that detects a current temperature of the at least one light source; and
- at least one light quantity sensor that detects a current light quantity of the at least one light beam before traveling through the optical filter, wherein the storage stores first correlation information and second correlation information about the at least one light source, wherein the first correlation information indicates a relationship between the temperature of the light source and spectral information about the light beam output from the light source, wherein the second correlation information indicates a relationship between the spectral information and a light quantity of the light beam at the light output unit, wherein the processor is configured to:
- calculate a variation in the spectral information about the at least one light beam based on the current temperature and the first correlation information;
- calculate a variation in the light quantity of the at least one light beam at the light output unit based on the variation in the spectral information and the second correlation information, the variation in the light quantity being caused by a change in the spectral information; and
- calculate a light-quantity correction amount for the at least one light source based on the variation in the light quantity and the current light quantity, and wherein the image processor configured to correct a signal value of each color in an image generated from the image signal based on the light-quantity correction amount.

11. A color-balance correction method for correcting a light quantity of a light beam output from a light source, wherein the light source is one of a plurality of light sources that respectively output a plurality of light beams having different spectra from each other, and the light beam output from the light source travels through at least one optical filter having specific spectral transmission properties, the color-balance correction method comprising:
- detecting a current temperature of the light source;
- detecting a current light quantity of the light beam before traveling through the at least one optical filter;
- calculating a variation in spectral information about the light beam based on the current temperature and first correlation information, the first correlation information indicating a relationship between the temperature of the light source and the spectral information about the light beam output from the light source;
- calculating a variation in a light quantity of the light beam after traveling through the at least one optical filter based on the variation in the spectral information and second correlation information, the variation being caused by a change in the spectral information, the second correlation information indicating a relationship between the spectral information about the light beam and the light quantity of the light beam after traveling through the at least one optical filter; and
- calculating a light-quantity correction amount for the light source based on the variation in the light quantity and the current light quantity.

* * * * *